United States Patent
Anwar et al.

(10) Patent No.: US 8,288,886 B2
(45) Date of Patent: Oct. 16, 2012

(54) METHOD AND APPARATUS FOR AVOIDING ELECTRICAL RESONANCE IN A VEHICLE HAVING A SHARED HIGH-VOLTAGE BUS

(75) Inventors: Mohammad N. Anwar, Van Buren Township, MI (US); Steven E. Schulz, Torrance, CA (US); Stephan N. Green, Zion, IL (US); James E. Tarchinski, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 325 days.

(21) Appl. No.: 12/614,464

(22) Filed: Nov. 9, 2009

(65) Prior Publication Data

US 2011/0109155 A1    May 12, 2011

(51) Int. Cl.
*B60L 1/00* (2006.01)
*B60L 3/00* (2006.01)
*H02G 3/00* (2006.01)

(52) U.S. Cl. ........ 307/9.1; 307/102; 307/105; 180/65.1; 318/139

(58) Field of Classification Search ........................ None
See application file for complete search history.

(56) References Cited

U.S. PATENT DOCUMENTS

| | | | | |
|---|---|---|---|---|
| 5,099,186 | A * | 3/1992 | Rippel et al. ................... | 318/803 |
| 7,748,482 | B2 * | 7/2010 | Holmes et al. ............. | 180/65.22 |
| 2003/0150352 | A1 * | 8/2003 | Kumar ............................ | 105/35 |
| 2006/0237247 | A1 * | 10/2006 | Severinsky et al. .......... | 180/65.4 |
| 2007/0227788 | A1 * | 10/2007 | Shige ............................ | 180/65.1 |
| 2008/0298785 | A1 * | 12/2008 | Patel et al. .................... | 388/820 |
| 2009/0066277 | A1 * | 3/2009 | Ang et al. ................ | 318/400.17 |
| 2009/0134828 | A1 * | 5/2009 | Chakrabarti et al. ......... | 318/440 |

FOREIGN PATENT DOCUMENTS

JP        2009-60723    *    3/2009

OTHER PUBLICATIONS

JP Pub 2007-202385 to Kawakami et al., english abstract, Aug. 9, 2007, B6OL 9_18.*

* cited by examiner

*Primary Examiner* — Rexford Barnie
*Assistant Examiner* — Justen Fauth
(74) *Attorney, Agent, or Firm* — Quinn Law Group, PLLC

(57) ABSTRACT

A method for avoiding electrical resonance in a vehicle having a high-voltage (HV) direct current (DC) bus shared by a first and a second power electronic converter device, such as an air conditioning compressor module (ACCM) and a traction power inverter (TPIM), includes determining an impedance characteristic of the bus, defining resonance points for the bus, selecting lower and upper switching frequency boundaries for the TPIM, and preventing the TPIM from operating within a range defined by these boundaries. A vehicle includes the first and second power electronic converter device, e.g., the APPM and the TPIM, the shared HV DC, and a controller having the algorithm set forth above, wherein the controller is adapted for avoiding electrical resonance in the HV DC bus by executing the algorithm.

11 Claims, 2 Drawing Sheets

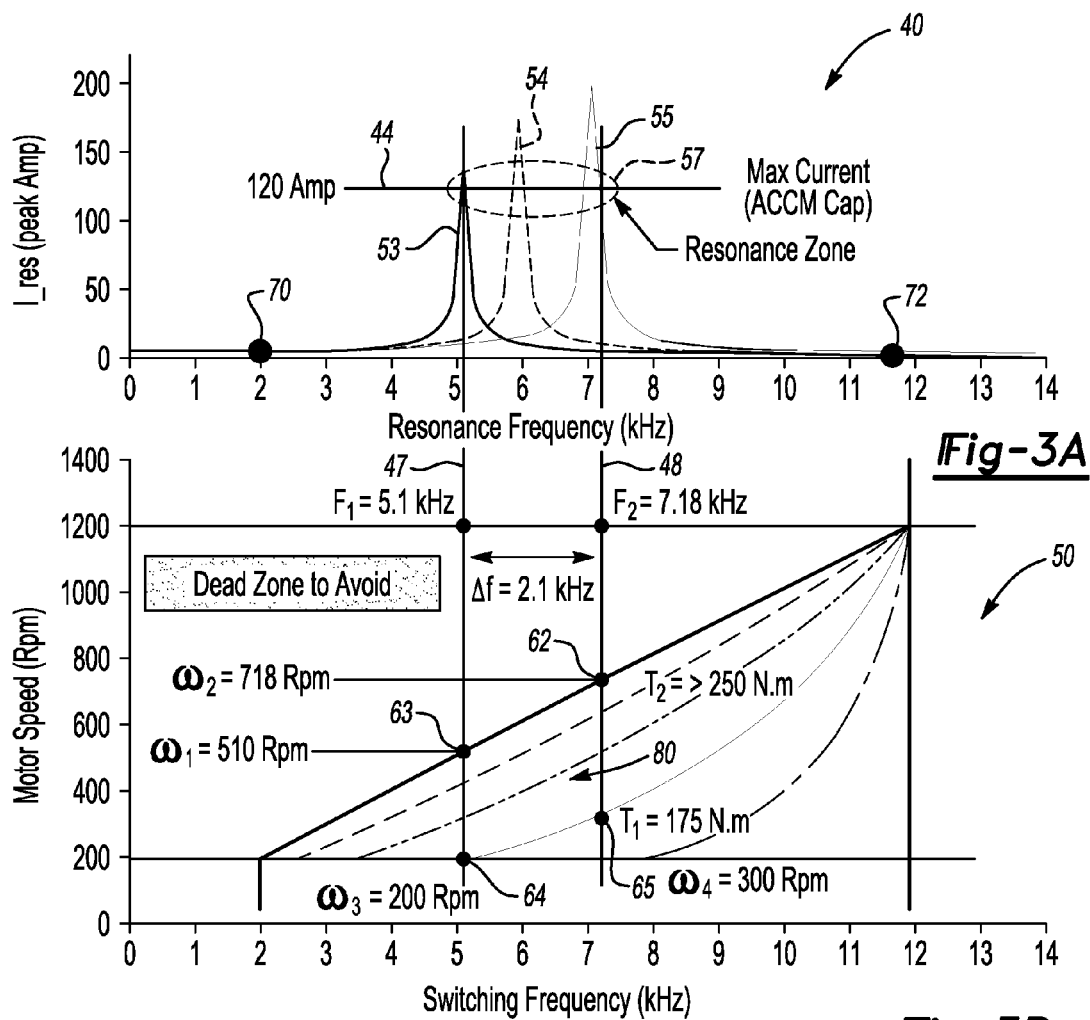
*Fig-3A*
*Fig-3B*
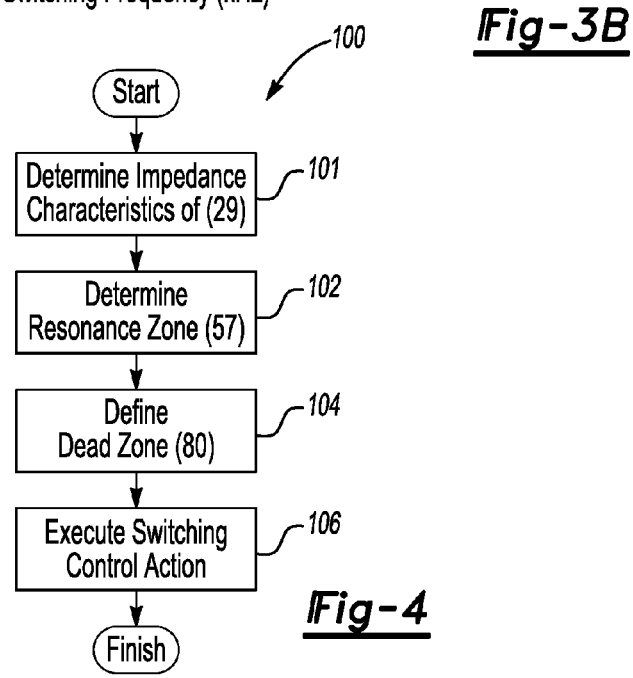
*Fig-4*

METHOD AND APPARATUS FOR AVOIDING ELECTRICAL RESONANCE IN A VEHICLE HAVING A SHARED HIGH-VOLTAGE BUS

TECHNICAL FIELD

The present invention relates to power flow control aboard a high-voltage propelled vehicle, and in particular a method and apparatus for avoiding electrical resonance in a vehicle having a high-voltage (HV) bus that is shared by multiple HV power electronic converter devices.

BACKGROUND OF THE INVENTION

In certain high-voltage propelled vehicles such as hybrid-electric vehicles (HEV), plug-in hybrid electric vehicles (PHEV), and electric vehicles (EV), a relatively high-voltage (HV) power supply, e.g., a battery or other electrochemical energy storage device, provides a source of at least a portion of the required propulsive power. If so equipped, an engine may be selectively powered off when the vehicle is idling or at a standstill in order to conserve fuel, and/or the vehicle can run entirely on electrical power provided by the HV power supply depending on the vehicle design.

The HV power supply can store energy at a relatively high voltage, typically on the order of 60 volts up to 300 volts or more, in order to provide sufficient electrical power for propelling the vehicle, as well as to energize various HV components and systems aboard the vehicle. Common HV vehicle components and systems may include one or more electric motor/generator units (MGU), a traction power inverter (TPIM), an air conditioning compressor inverter module (ACCM), and/or an auxiliary power module (APM).

The HV power supply can transmit HV electrical current across positively and negatively charged conductive rails of an HV direct-current (DC) bus portion of a dedicated HV electrical circuit. The HV DC bus may be shared by multiple power electronic converter devices, e.g., the TPIM and ACCM noted above. Each of these power electronic converter devices may include DC-side filter components, such as internal capacitors and/or inductors, in order to meet the various circuit requirements, e.g., those related to ripple voltages and currents. The DC-side filter components may also contain electromagnetic-compatible (EMC) components, for example common-mode choke components or additional capacitors. In addition, the DC cables connecting the power electronic converters have equivalent series inductances that may add to those of the DC-side filter components.

The inductors and capacitors form a circuit having an electrical resonance frequency, i.e., a particular high-magnitude alternating current (AC) that oscillates in the circuit when an equivalent series impedance between a circuit input and output is at a minimum. If any power electronic converter within the HV system generates frequency components on the shared DC bus that fall within the resonance frequency range, the DC bus will be excited, and an electrical resonance will result. In some DC bus control algorithms, a pulse-width modulation (PWM) switching frequency profile may be caused to vary with motor speed and torque. For example, the PWM switching frequency may decrease with an increasing torque for a given motor speed, and may increase with increasing speed for a given motor torque.

SUMMARY OF THE INVENTION

Accordingly, a method is provided for avoiding electrical resonance in a vehicle having a shared high-voltage (HV) direct current (DC) bus as described above. Such a resonance may cause a voltage oscillation that may produce an AC current swing potentially affecting the life expectancy of one or more circuit devices. Acoustic noise may also occur if the electrical resonance matches the natural frequency of a mechanical structure aboard the vehicle.

For a two-inverter circuit, a resonance frequency may be calculated via the equation: $1/2\pi\sqrt{LC}$, where C is the capacitance in Farad (F) and L is the inductance in Henry (H). The capacitance and inductance values used in this particular equation will vary due to part-to-part tolerances, circuit temperature fluctuations, and vehicle-to-vehicle layout differences. As a result, rather than a single resonance frequency there is a resonance frequency range for the HV circuit as described herein.

Such an HV circuit may include a power electronic converter in the form of a traction power inverter module (TPIM). The TPIM may be configured as a pulse-width modulated (PWM) inverter device, where a PWM switching frequency follows a profile that varies between a low value and a high value, e.g., a range of approximately 2 kHz to approximately 12 kHz according to one embodiment. This variation may occur as a function of motor operating speed and torque in order to achieve certain performance objectives, such as but not limited to reduced engine cranking noise, improved inverter efficiency, and lower thermal stress.

Within the scope of the present invention, an Air Conditioning Compressor Inverter Module (ACCM) as noted above is another PWM inverter device that may share the HV DC bus with the TPIM. The ACCM has to carry a significant amount of power flow, and therefore operates with a relatively high PWM switching frequency, e.g., approximately 10 kHz or more according to one embodiment. This PWM switching frequency may generate thermal stresses on the various power switches of the ACCM. As a result, to meet HV DC voltage and current ripple requirements, certain capacitor and/or inductor filter components for the ACCM may be designed or selected such that an electrical resonance frequency range thereof falls within the PWM switching range of the TPIM.

One way to avoid such electrical resonance is to design the ACCM filter components to produce a resonance frequency that is either lower than or higher than the lower range limit of the TPIM, e.g., lower than approximately 2 KHz or higher than approximately 12 KHz in the embodiment noted above. Using that example, to produce a resonance frequency lower than 2 KHz the filter components may be too large to effectively implement in terms of packaging size and cost. Likewise, to produce a resonance frequency higher than 12 kHz in the same embodiment, the filter components may have to be too small to meet ripple requirements, and thus to ensure optimal control stability.

Accordingly, the method of the present invention, which may be embodied in algorithm form and automatically executed via a controller aboard the vehicle, provides a software-based solution for devising an optimal PWM switching frequency profile. This profile avoids a resonance frequency range between shared electronic power converter devices, e.g., a TPIM and an ACCM.

In particular, the method avoids electrical resonance in a vehicle having a high-voltage (HV) direct current (DC) bus shared by a first and a second power electronic converter device, e.g., an Air Conditioning Compressor Module (ACCM) and a Traction Power Inverter Module (TPIM), respectively. The method includes determining an impedance characteristic of the shared DC bus, which defines the resonance points thereof. Lower and upper frequency boundaries are selected for the switching frequencies of the second power electronic converter device, such that the second device does not excite the resonance in the DC bus. The method then prevents the switching frequency of the second device from operating within the range ($F_1$, $F_2$) to thereby avoid electrical resonance in the HV DC bus.

A high-voltage propelled vehicle includes first and second power electronic converter devices, an HV DC bus that is shared by the first and second power electronic converter devices, and a controller. The controller has an algorithm adapted for avoiding electrical resonance in the HV DC bus, with the algorithm being adapted for determining the impedance characteristics of the HV DC bus to thereby define a set of resonance points. The algorithm is further adapted for determining switching frequency upper and lower boundaries for the second device, such that the second device does not excite the resonance on the HV DC bus. Finally, the algorithm prevents the second device from operating within the range ($F_1$, $F_2$) as set forth herein.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3A is an electrical resonance bode-plot diagram for the circuit shown in FIG. 2;

FIG. 3B is a plot of a modified TPIM PWM switching profile in accordance with the invention; and FIG. 4 is a flow chart describing the method or algorithm of the present invention.

DESCRIPTION OF THE PREFERRED EMBODIMENTS

Figure 1:
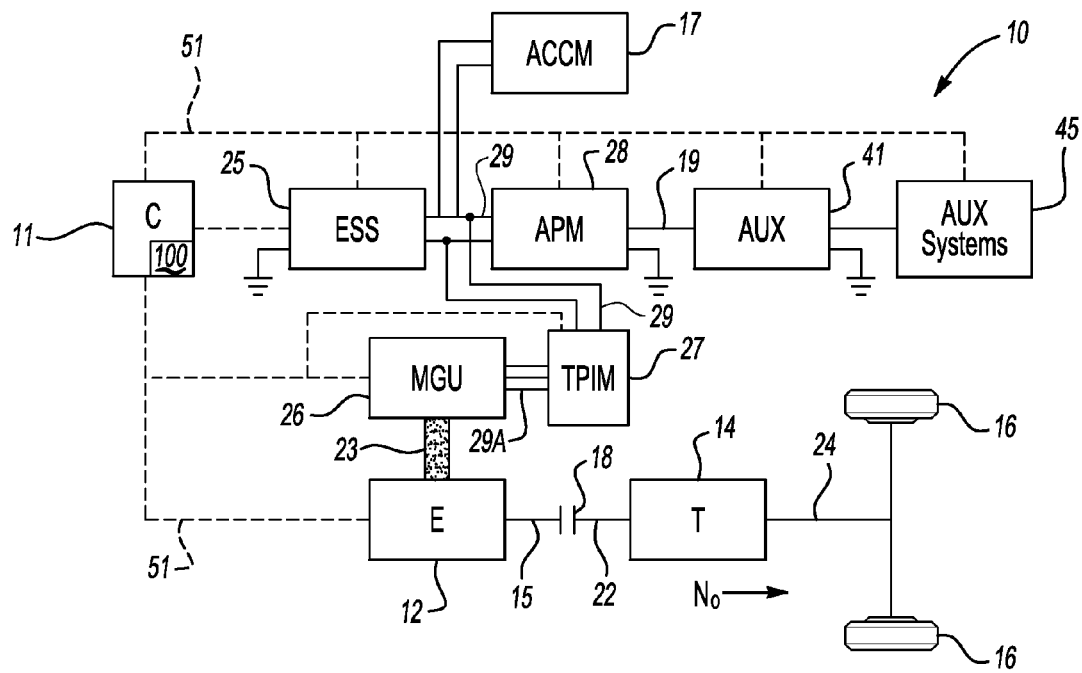
FIG. 1 is a schematic illustration of a high-voltage (HV) propelled vehicle having an HV direct current (DC) bus that is shared by multiple HV power electronic converter devices.

Referring to the drawings, wherein like reference numbers correspond to like or similar components throughout the several figures, FIG. 1 shows a high-voltage (HV) propelled vehicle 10. The vehicle 10, which may be configured as a hybrid electric vehicle (HEV) in one embodiment as shown, includes a controller (C) 11 having an algorithm 100 adapted for avoiding electrical resonance on a shared HV direct current (DC) bus 29 as explained below.

The vehicle 10 may include an internal combustion engine (E) 12 having an input member (not shown) and an output member 15 when configured as an HEV as shown. The vehicle 10 includes a transmission (T) 14 having an input member 22 and an output member 24. Output member 15 of the engine 12 may be selectively connected to the input member 22 of the transmission 14 via a torque transfer mechanism 18. The transmission 14 may be configured as an electrically variable transmission (EVT) or any other suitable transmission capable of transmitting propulsive torque to a set of road wheels 16 via output member 24 of the transmission. Output member 24 rotates at an output speed ($N_O$) in response to an output speed request, which is ultimately determined by the controller 11 based on a set of driver inputs or commands.

The vehicle 10 may include an HV electric motor/generator unit (MGU) 26, such as a multi-phase electric machine of approximately 60 volts to approximately 300 volts or more depending on the vehicle design. The MGU 26 is electrically connected to an HV energy storage system (ESS) 25, e.g., a rechargeable battery, via a traction power inverter module (TPIM) 27, an HV alternating current (AC) bus 29A for conducting a multi-phase current to the MGU, and the HV DC bus 29. During normal operation of the vehicle 10, the MGU 26 may be used to selectively rotate a belt 23 of the engine 12, or another suitable portion thereof, thereby cranking the engine during a restart event. The ESS 25 may be selectively recharged using the MGU 26 when the MGU is operating in its capacity as a generator, for example by capturing energy during a regenerative braking event.

The HV DC bus 29 is shared by multiple power electronic converters, such as but not necessarily limited to the TPIM 27, an air conditioning compressor inverter module (ACCM) 17, and an auxiliary power module (APM) 28 such as a DC-to-DC converter. The APM 28 may be electrically connected to an auxiliary battery (AUX) 41, e.g., a 12-volt DC battery, via a low-voltage (LV) bus 19, and adapted for energizing one or more auxiliary systems 45 aboard the vehicle 10.

Still referring to FIG. 1, the controller 11 may be configured as a single or a distributed control device that is electrically connected to or otherwise in hard-wired or wireless communication with each of the engine 12, the ESS 25, the MGU 26, the TPIM 27, the APM 28, and the auxiliary battery 41 via control channels 51, as illustrated by dashed lines. Control channels 51 may include any required transfer conductors, e.g., a hard-wired or wireless control link(s) or path(s) suitable for transmitting and receiving the necessary electrical control signals for proper power flow control and coordination aboard the vehicle 10. The controller 11 may include such control modules and capabilities as might be necessary to execute all required power flow control functionality aboard the vehicle 10 in the desired manner.

The controller 11 may be configured as a digital computer device or devices generally comprising a microprocessor or central processing unit (CPU), read only memory (ROM), random access memory (RAM), electrically-erasable programmable read only memory (EEPROM), a high-speed clock, analog-to-digital (A/D) and digital-to-analog (D/A) circuitry, and input/output circuitry and devices (I/O), as well as appropriate signal conditioning and buffer circuitry. Any algorithms resident in the controller 11 or accessible thereby, including the auto stop/auto start cycling frequency optimizing algorithm 100 in accordance with the invention as described below, can be stored in ROM and executed to provide the respective functionality. The controller 11 includes or has access to the algorithm 100 mentioned above and described below with reference to FIG. 4, and is adapted to execute the algorithm 100 to avoid electrical resonance in the shared HV DC bus 29.

The TPIM 27 may be configured as a pulse-width modulated (PWM) inverter device, where the PWM switching frequency thereof follows a profile that varies between calibrated low and high values, e.g., approximately 2 kHz to approximately 12 kHz according to one embodiment. This frequency variation occurs as a function of motor operating speed and torque, i.e., the rotational output speed and torque of MGU 26, to achieve certain performance objectives. Such objectives may include but are not necessarily limited to a quiet vehicle cranking, improved or optimized inverter efficiency, and lower thermal stresses.

The ACCM 17 shares the HV DC bus 29 with the TPIM 27, and carries significant power flow. The ACCM 17 may have a PWM switching frequency of approximately 10 kHz according to one embodiment, and may contain thermal stresses on its internal power switches. As a result, and to meet HV DC voltage and current ripple requirements, i.e., the difference between the peak voltage and minimum voltage provided by an AC power supply, filter components such as inductors and capacitors may be selected such that there is an electrical resonance frequency, as noted in the background section hereinabove, that falls within the limits of the PWM switching range of the TPIM 27.

One way to avoid electrical resonance is to design or select the filter components of the ACCM 17 so as to reduce the resonance frequency below the low end of the predetermined TPIM switching range, e.g., below approximately 2 kHz in the embodiment noted previously hereinabove, or above the high end of the switching range, e.g., above 12 kHz, in the example set forth above. To create a resonance frequency lower than 2 kHz, for example, the filter components may be too large to implement, both in packaging size as well as cost. Likewise, to make the resonance frequency higher than 12 kHz the filter components may be too small to meet ripple requirements, and to ensure control stability and current regulation for the ACCM 17. The controller 11 is thus adapted to provide a software-based solution in the form of the algorithm 100 as set forth herein, which when executed by the controller provides an optimal PWM switching frequency profile, i.e., a profile that avoids the resonance frequency range between the TPIM 27 and the ACCM 17 on the shared HV DC bus 29.

Figure 2:
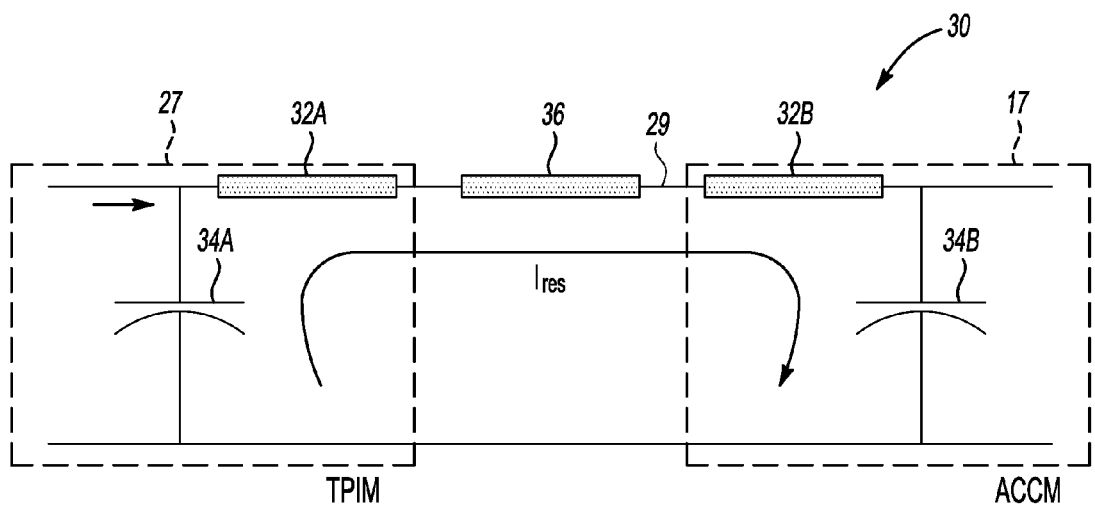
FIG. 2 is a schematic electric circuit diagram for a shared HV DC bus connecting a Traction Power Inverter Module (TPIM) and an Air Conditioning Compressor Module (ACCM) aboard the vehicle shown in FIG. 1.

Referring to FIG. 2, a diagram of an HV circuit 30 shows the HV DC bus 29, the ACCM 17, and the TPIM 27, with the ACCM and TPIM being a representative pair of power electronic converter devices as described above. Within the TPIM 27, integrated circuit components may include a capacitor 34A and an equivalent series inductance device 32A, e.g., a bus bar, inductors, common-mode choke device, etc. Likewise, the ACCM 17, which shares the DC bus 29 with the TPIM 27, includes similar integrated circuit components in capacitor 34B and equivalent series inductance device 32B. HV cables 36 are used to connect the ACCM 17 and TPM, thus completing the HV circuit 30.

A resonance frequency may be calculated for a two-inverter circuit as shown via the equation: $F_R = 1/2\pi\sqrt{LC}$, where C is the capacitance in Farad (F) and L is the inductance in Henry (H) as noted above. The capacitance and inductance values used in this particular equation will vary due to part-to-part tolerances, circuit temperature fluctuations, and vehicle-to-vehicle layout differences, and the resultant resonant frequency ($F_R$) is in the form of a frequency range rather than a discrete frequency due largely to the part-to-part tolerances and temperature variation of the various components in the HV circuit 30.

Referring to FIGS. 3A and 3B, a frequency response plot 40 is shown (FIG. 3A) relative to a switching frequency plot 50 (FIG. 3B). In FIG. 3A, the cases of a minimum resonance frequency 53, a typical resonance frequency 54, and a maximum resonance frequency 55 are plotted for the ACCM 17 of FIG. 1, along with a resonance zone 57 that is created with respect to these values. A maximum current or ACCM cap current 44 divides the resonance zone 57 as shown. A solution for avoiding electrical resonance in the HV circuit 30 of FIG. 2 should consider all of these combinations, covering the outer envelope, i.e., approximately 2 kHz at point 70 to approximately 12 kHz at point 72 in the embodiment shown in FIG. 3A. FIG. 3A shows that the resonance current ($I_{res}$) varies with respect to the resonance frequency.

For an exemplary maximum motoring torque of 370 Nm at a motor speed of approximately 600 rpm, a maximum current 44 of approximately 120 amps may be determined via lines 47 and 48 corresponding to frequencies $F_1$ and $F_2$, respectively of FIG. 3B. From this, it is observed that a worst case resonance current ($I_{res}$) may be determined to flow through all of the filter components shown in FIG. 2 as described above. Of these, the capacitor 34B within the ACCM 17 may be the weakest component in terms of its ability to withstand a resonance current oscillation.

In the exemplary data set noted above, the peak current or ACCM cap current 44 of approximately 120 amps should be avoided. The proposed modification to the TPIM switching frequency profile to avoid this current 44 is shown via the switching frequency plot 50 of FIG. 3B. For a motor torque of less than 175 Nm, i.e., point 65, the resonance current ($I_{res}$) is less than 120 A, as seen by following line 48 between FIGS. 3A and 3B. For this particular torque range, no PWM switching profile modification is needed.

However, a resonance dead zone 80 may be defined by the corner points 62, 63, 64, 65 that should be avoided in terms of the corresponding switching frequency ($F_1$ and $F_2$), motor torque ($T_1$ and $T_2$), and motor speed ($\omega 1$, $\omega 2$, $\omega 3$, and $\omega 4$). These frequency, torque, and speed corner points may be calibrated based on the desired vehicle control strategy. The dead zone 80 could be different for different vehicles. Also, the strategy may differ for different motors within a vehicle based on the performance tradeoffs.

The strategy of choosing a TPIM switching frequency may be determined by considering the following performance-related tradeoffs: (a) TPIM efficiency and maximum junction temperature changes, (b) control dynamics, current regulator bandwidth, and dead time effects; (c) quality of AC phase current and torque ripple changes; (d) DC current/voltage ripple and filter capacitor root mean square (RMS) current; (e) hysteresis on switching frequency implementation, and (f) vehicle performance.

Referring to FIG. 4, the controller 11 may be configured to change a pre-calculated TPIM PWM switching frequency ($F_{sw}$) based on its relation to the parameters of dead zone 80. Such a determination may be made during calibration of the vehicle 10 of FIG. 1 based on the performance-related tradeoffs outlined above. At least three options, i.e., Options I, II, and III, may be implemented as noted below with respect to step 106.

At step 101, and with reference to FIG. 2, the algorithm 100 first determines the impedance characteristics of the shared HV DC bus 29 to ultimately determine a set of resonance points. For example, the equivalent impedance of circuit 30 of FIG. 2 may be calculated. Step 101 may be executed for a range of parameter values, i.e., the impedance and capacitance values may vary within the circuit of FIG. 2, resulting in different frequency response plots as shown in FIG. 3A. Once the impedance characteristics of the shared HV DC bus 29 are determined, the algorithm 100 proceeds to step 102.

At step 102, and with reference to FIG. 3A, the algorithm 100 defines the resonance zone 57 of FIG. 3A for the HV circuit 30 of FIG. 2, with the ultimate goal of avoiding this resonance zone during operation of the vehicle 10. Once the resonance zone 57 is determined, the algorithm 100 proceeds to step 104.

At step 104, and with reference to FIG. 3B, the points 62, 63, 64, and 65 defining and recording the dead zone 80 are determined using the resonance zone 57 shown in FIG. 3A. That is, the dead zone 80 is defined in terms of switching frequency ($F_1$ and $F_2$), which defines the lower and upper frequency boundaries of the dead zone via lines 47 and 48, respectively; motor torque ($T_1$ and $T_2$) of the MGU 26 shown in FIG. 1, and motor speed ($\omega 1$, $\omega 2$, $\omega 3$, and $\omega 4$). Step 102 chooses the lower and upper frequency boundaries, i.e., $F_1$ and $F_2$, for the switching frequency for TPIM 27 of FIG. 1, such that the TPIM does not excite the resonance on the shared HV DC bus 29. Once the dead zone 80 is defined, the algorithm 100 proceeds to step 106.

At step 106, the algorithm 100 executes one of a predetermined plurality of control actions to prevent the TPIM 27 from operating within the range ($F_1$, $F_2$) and to avoid the resonance in the shared HV DC bus 29. For example, using Option I, the controller 11 may make the following determination: if the pre-calculated TPIM switching ($F_{sw}$)>=$F_1$ and ($F_{sw}$)<=$F_2$, then the algorithm may modify the TPIM switching frequency such that ($F_{sw}$)*=$F_1$, where ($F_{sw}$)* represents the modified resonance-avoiding TPIM PWM switching frequency, and wherein $F_1$ and $F_2$ refer to the frequencies corresponding with the lower and upper limits of dead zone 80.

For Option II, if $F_{sw}$>=$F_1$ and $F_{sw}$<=$F_2$, then the algorithm 100 may modify the TPIM switching frequency such that $F_{sw*}$=$F_2$.

For option III, if $F_{sw}$>=$F_1$ and $F_{sw}$<=($F_1$+$F_2$)/2, then the algorithm 100 may modify the TPIM switching frequency such that $F_{sw*}$=$F_1$, or else if $F_{sw}$>=($F_1$+$F_2$)/2, and $F_{sw}$<=$F_2$, then $F_{sw*}$=$F_2$.

A time-based hysteresis may also be implemented together with Options I-III. In this embodiment, if the pre-calculated TPIM switching frequency ($F_{sw}$) falls within the dead zone 80, algorithm 100 may automatically clamp to the upper or lower limit of the dead zone, i.e., either F1 or F2. If the TPIM switching frequency ($F_{sw}$ is less than the lower limit ($F_1$ of FIG. 3B) for greater than a calibrated duration, the pre-calculated TPIM switching frequency ($F_{sw}$) may continue to be used, with the algorithm 100 otherwise clamping to the upper or lower edge or limit, or lines 47 or 48 of FIG. 3A, respectively.

While the best modes for carrying out the invention have been described in detail, those familiar with the art to which this invention relates will recognize various alternate designs and embodiments for practicing the invention within the scope of the appended claims.

The invention claimed is:

1. A method for avoiding electrical resonance in a vehicle having a motor generator unit (MGU) and a high-voltage (HV) direct current (DC) bus that is shared by a first and a second power electronic converter device, the method comprising:
   determining an impedance characteristic of the HV DC bus;
   defining a set of resonance points of the HV DC bus using the impedance characteristic;
   determining and recording a resonance dead zone as a function of the set of resonance points, including recording each of a torque output of the MGU and a speed of the MGU, wherein the resonance dead zone includes an upper and a lower switching frequency boundary; and
   using the controller to execute an algorithm to automatically modify a switching frequency profile of the second power electronic converter device, such that the second power electronic converter device is prevented from operating within a frequency range defined by the upper and lower switching frequency boundary.

2. The method of claim 1, wherein the first power electronic converter device is configured as a pulse-width modulated (PWM) device.

3. The method of claim 1, including setting a switching frequency of the second power electronic converter device equal to one of the upper and lower switching frequency boundaries.

4. The method of claim 3, further comprising:
   determining if a pre-calculated switching frequency of the second power electronic converter device is less than the lower switching frequency boundary for at least a calibrated duration; and
   setting a switching frequency of the second power electronic converter device equal to one of the upper and the lower switching frequency boundaries only if the pre-calculated switching frequency is less than the lower switching frequency boundary for at least the calibrated duration.

5. A method for avoiding electrical resonance in a hybrid electric vehicle (HEV) having a high-voltage (HV) direct current (DC) bus shared by an HV air conditioning compressor inverter module (ACCM) and an HV traction power inverter module (TPIM), the method comprising:
   determining an impedance characteristic of the HV DC bus;
   defining a set of resonance points of the HV DC bus using the impedance characteristic;
   selecting a lower switching frequency boundary and an upper switching frequency boundary of a resonance dead zone for the TPIM as a function of the resonance points; and
   using a controller to prevent a TPIM from operating at a switching frequency between the lower switching frequency boundary and the upper switching frequency boundary to thereby avoid the electrical resonance;
   setting a switching frequency of the TPIM equal to one of the lower switching frequency boundary and the upper switching frequency boundary, including:
      determining if a pre-calculated switching frequency of the TPIM is less than the lower switching frequency boundary for at least a calibrated duration; and
      setting the switching frequency of the TPIM equal to one of the lower switching frequency boundary and the upper frequency boundary only if the pre-calculated switching frequency is less than the lower switching frequency boundary for at least the calibrated duration.

6. The method of claim 5, wherein the ACCM and the TPIM are each configured as a pulse-width modulated (PWM) device.

7. The method of claim 5, wherein the HEV includes an HV motor generator unit (MGU), and wherein the resonance dead zone is further defined by each of: a torque output of the MGU and a speed of the MGU.

8. The method of claim 5, further comprising:
   establishing the resonance dead zone based on a predetermined HEV performance strategy.

9. A high-voltage propelled vehicle comprising:
   a first power electronic converter device;
   a second power electronic converter device, wherein the first power electronic converter device is an Air Conditioning Compressor Module (ACCM) and the second power electronic converter device is a Traction Power Inverter Module (TPIM);
   a high-voltage (HV) direct current (DC) bus that is shared by the first power electronic converter device and the second power electronic converter device; and
   a controller configured to avoid electrical resonance in the HV DC bus, wherein the controller is configured to:
      determine an impedance characteristic of the HV DC bus;
      define a set of resonance points of the HV DC bus using the impedance characteristic;

determine and record a resonance dead zone as a function of the set of resonance points, the resonance dead zone having an upper and a lower switching frequency boundary; and automatically modify a switching frequency profile of the second power electronic converter device, such that the second power electronic converter device is prevented from operating within a frequency range defined by the upper and lower switching frequency boundary.

10. The vehicle of claim 9, wherein the ACCM and the TPIM are each configured as a pulse-width modulated (PWM) device.

11. The vehicle of claim 9, wherein the controller is configured to modify a switching frequency of the TPIM by setting the switching frequency of the TPIM equal to one of the lower switching frequency boundary and the upper switching frequency boundary.

* * * * *